Feb. 14, 1939.   C. C. McCAIN   2,146,834
APPARATUS FOR SELECTING RECORDS
Filed Feb. 17, 1938   3 Sheets-Sheet 1
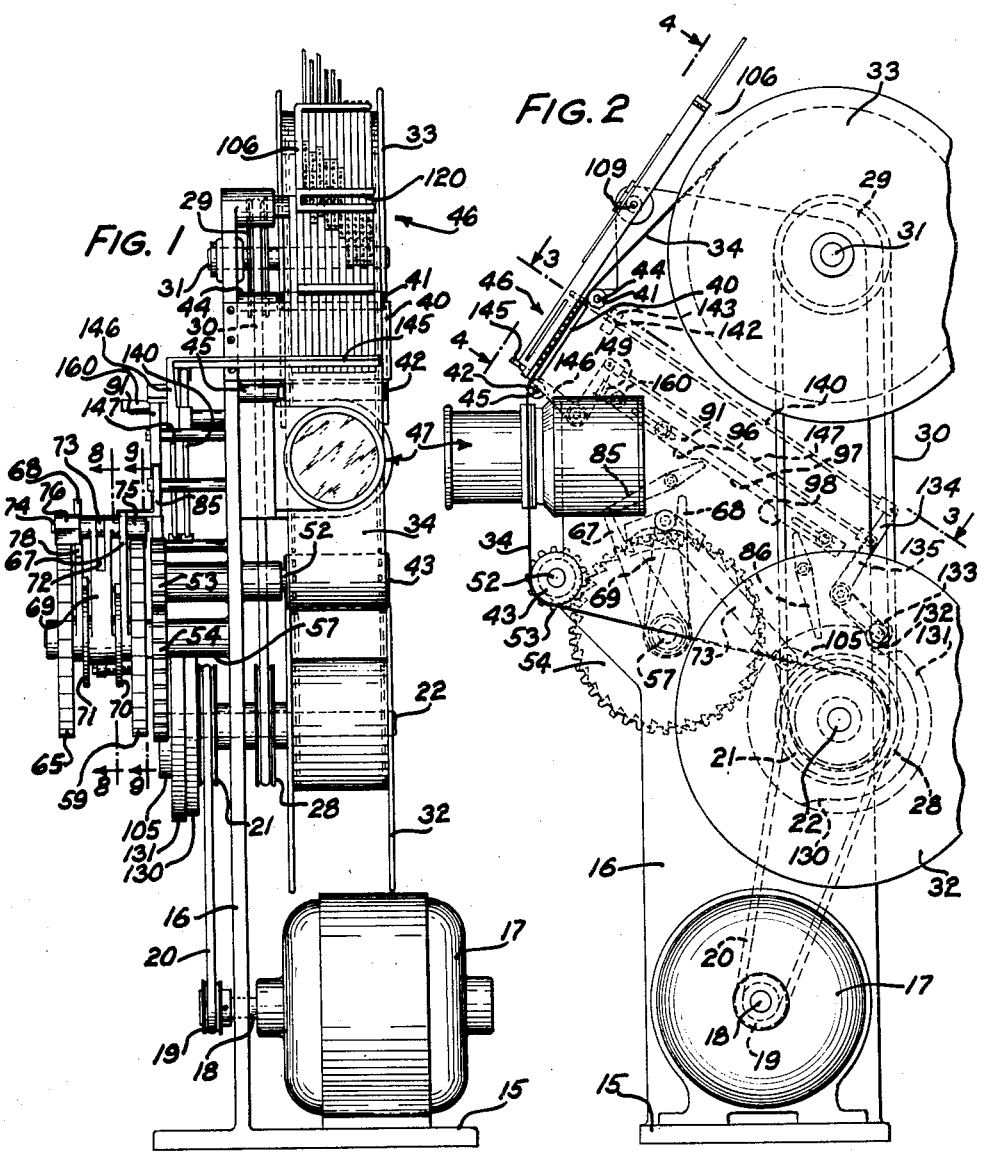
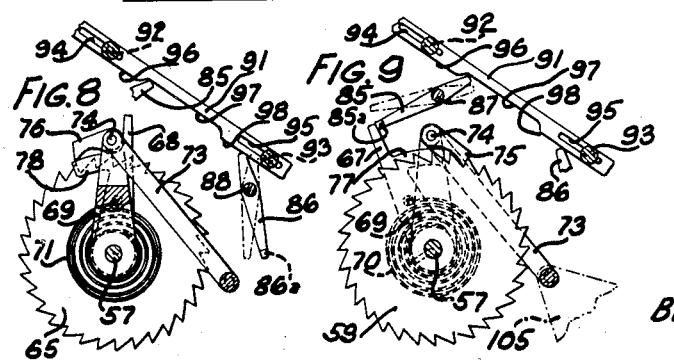
INVENTOR
C. C. McCAIN
BY Emery Robinson
ATTORNEY

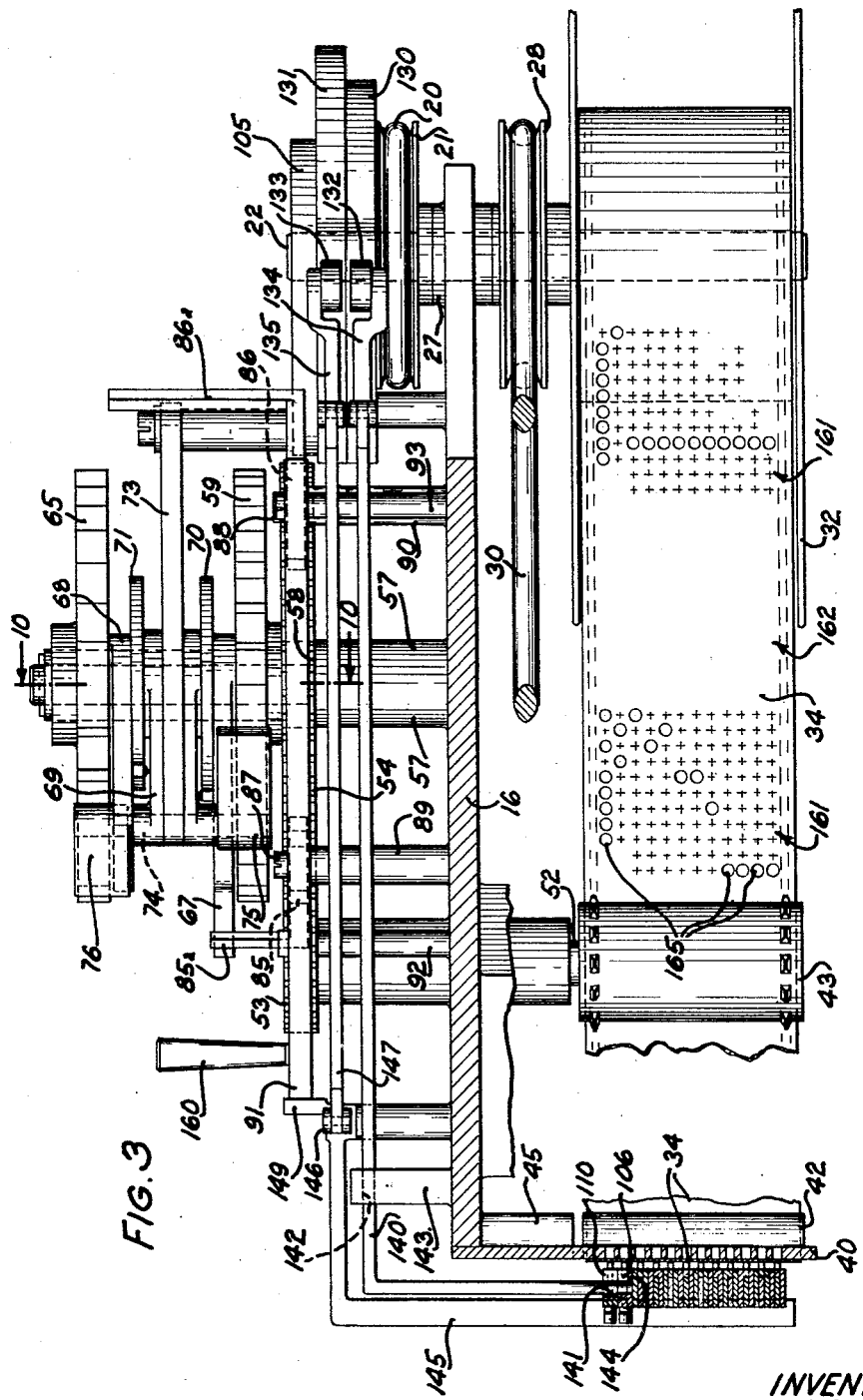

Feb. 14, 1939.  C. C. McCAIN  2,146,834
APPARATUS FOR SELECTING RECORDS
Filed Feb. 17, 1938   3 Sheets-Sheet 3
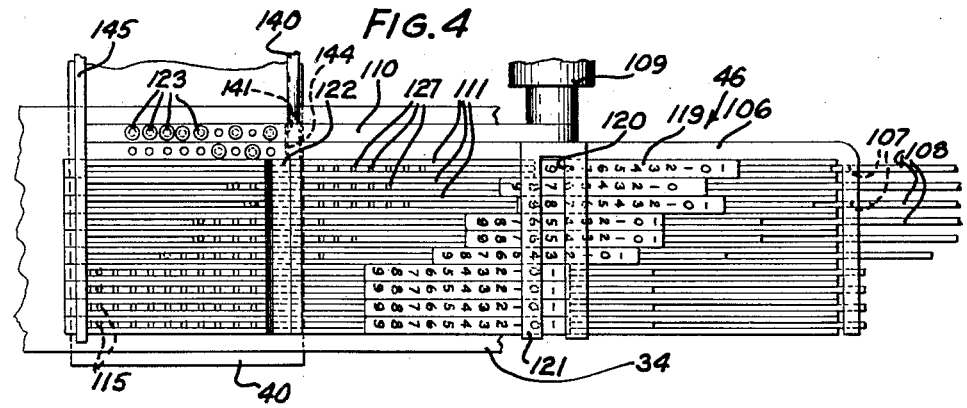
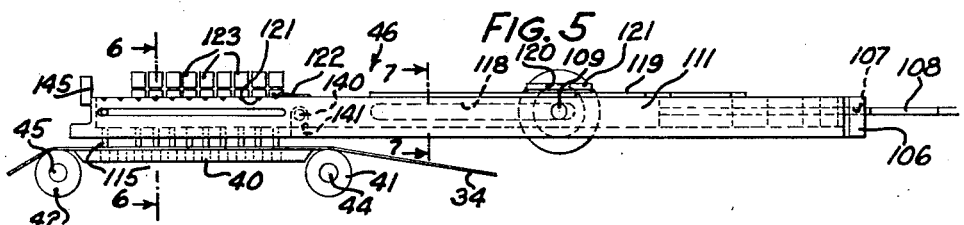
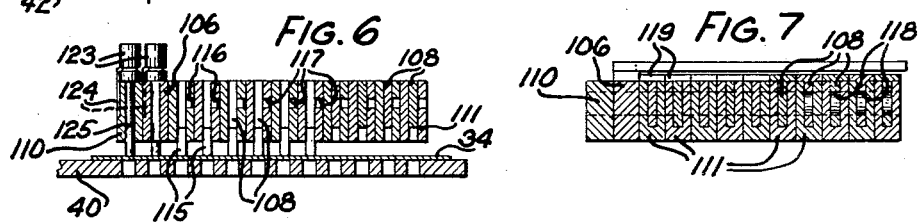
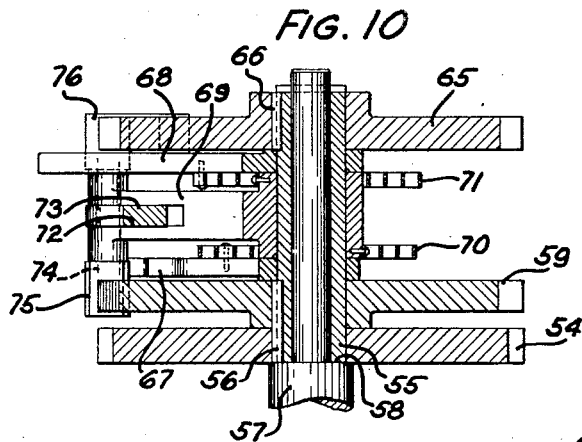
INVENTOR
C. C. McCAIN
BY Emery Robinson
ATTORNEY Patented Feb. 14, 1939

2,146,834

UNITED STATES PATENT OFFICE 2,146,834

APPARATUS FOR SELECTING RECORDS

Cecil C. McCain, Glen Ellyn, Ill., assignor to Western Electric Company, Incorporated, New York, N. Y., a corporation of New York Application February 17, 1938, Serial No. 190,963

10 Claims. (Cl. 40—31)

This invention relates to apparatus for selecting records and more particularly to an apparatus for selecting a photographic negative from a plurality of negatives on a roll of film.

The practice of making greatly reduced photographic reproductions of records on rolls of film and either destroying the originals or storing them in so-called dead storage in order to conserve valuable filing space, has become widely used in some businesses. This practice has not been more widely adopted due to the lack of a satisfactory means for quickly selecting a record from a group of records stored on one film. It has been the practice to project enlargements of the films upon a screen and thereby select the desired record after a visual examination of the roll of film. This method of selection is slow and tedious and therefore not entirely satisfactory.

It is an object of the present invention to provide a simple and accurate apparatus for rapidly and automatically selecting records from a group of records.

In accordance with one embodiment of the invention, the photographs are spaced on the film so as to leave a space adjacent each photograph for identifying marks in the form of perforations, whereby the photographs may be identified by a mechanical selector which is adapted to feed the film rapidly step by step past a sensing station until the desired photograph is found. At the sensing station there are provided a plurality of settable pins which may be set to select any number within the limits of the machine and which may also determine the presence or absence and location of dashes in the number. The sensing pins are automatically moved into engagement with the film while it is stationary, and if they all pass through the film, i. e., if the combination punched in the film corresponds with the combination set up at the sensing station, mechanism is thereupon operated to stop the feeding of the film, with the selected photograph in position where an enlarged image thereof may be cast upon a screen or reflected onto sensitized paper to make a photographic positive.

Other advantages of the invention will be apparent by referring to the following detailed description when considered in conjunction with the accompanying drawings, wherein Fig. 1 is a front elevational view of the apparatus;

Fig. 2 is a side elevational view of the apparatus shown in Fig. 1;

Fig. 3 is an enlarged sectional view taken on the line 3—3 of Fig. 2 in the direction of the arrows;

Fig. 4 is an enlarged fragmentary view taken looking down at the sensing mechanism substantially along the line 4—4 of Fig. 2 in the direction of the arrows;

Fig. 5 is a side elevational view of the apparatus shown in Fig. 4;

Figs. 6 and 7 are transverse sectional views taken substantially along the lines 6—6 and 7—7, respectively, of Fig. 5 in the direction of the arrows;

Figs. 8 and 9 are fragmentary sectional views taken substantially along the lines 8—8 and 9—9, respectively, of Fig. 1 in the direction of the arrows; and Fig. 10 is an enlarged fragmentary view taken along the line 10—10 of Fig. 3 in the direction of the arrows.

Referring now to the drawings, wherein like reference numerals designate the same parts throughout the several views, the numeral 15 indicates generally a base having an upwardly extending standard 16 upon which the various parts of the mechanism are supported. Secured to the base, in any suitable manner, is a driving motor 17, the shaft 18 of which extends through an aperture in the standard 16 and carries a pulley 19 at its left end (Fig. 1). The pulley 19 drives a belt 20, which, in turn, transmits power to a pulley 21 mounted upon a shaft 22 (Fig. 3). The shaft 22 is rotatably mounted in a bearing 27 formed integrally with the standard 16 and extends through the standard 16. Fixed to the shaft 22 is a pulley 28 for transmitting power through a belt 30 to another pulley 29, fixed to a shaft 31, which is, in turn, rotatably mounted on the standard 16. Mounted upon the shafts 22 and 31, adjacent to the pulleys 28 and 29, are reels 32 and 33, respectively, which frictionally engage the shafts and urged to rotate with the shafts by any suitable type of friction clutch to tend to feed a film 34 fixed upon the reels 32 and 33 in opposite directions, whereby the film 34 will be maintained under tension and held stationary until the feeding apparatus, to be described hereinafter, becomes operative to drive the film either upwardly or downwardly (Fig. 1).

The film 34, which is stretched taut between the two reels, is supported in a position over a perforated plate 40 by a pair of guide rollers 41 and 42 and then extends downwardly to a feeding sprocket 43. The guide rollers 41 and 42 are freely rotatable on stud shafts 44 and 45, respectively, mounted upon the standard 16 and cooperate with the reels 32 and 33 to hold one portion of the film in position to be sensed by a sensing mechanism, designated generally by the numeral 46, and the second portion of the film at an enlarging station 47.

The feeding sprocket 43 is mounted upon a shaft 52, journalled in the standard 16, and having fixed to the end thereof, away from the sprocket 43, a gear 53. The gear 53 meshes with and is adapted to be driven by a gear 54, fixed to a sleeve 55 (Fig. 10) by means of a key 56. The sleeve 55 is freely rotatable on a stud shaft 57, fixed to the standard 16, and having a shoulder 58 against which the gear 54 and sleeve 55 bear. The key 56 also serves the purpose of fixing a ratchet 59 to the sleeve 55. A second ratchet 65 is fixed to the sleeve 55 by means of a key 66 and rotatably mounted on the sleeve 55, between the ratchets 59 and 65, are a pair of cam levers 67 and 68 and a pawl supporting lever 69. These levers are arranged with the pawl supporting lever 69 positioned between the two cam levers 67 and 68.

The hub of the pawl supporting lever 69 has a pair of flat coil springs 70 and 71 fixed thereto and to the cam levers 67 and 68, respectively, for tending to hold the pawl supporting lever and cam levers in alignment. The extending end of the pawl supporting lever has a slot 72 formed therein for receiving an actuating rod 73, which is pivoted to the end of the lever by means of a pivot pin 74. The pin 74 also pivotally supports a pair of oppositely disposed pawls 75 and 76, which are adapted to engage the teeth of the ratchets 59 and 65, respectively, the pawls being operable, one at a time, depending upon the position of their associated cam levers 67 and 68. The coil springs 70 and 71 normally urge the cam levers 67 and 68 clockwise and counterclockwise, respectively, (Figs. 8 and 9) to a position where camming portions 77 and 78, formed on the cam levers 67 and 68, respectively, will hold the pawls 75 and 76, respectively, out of the teeth of their associated ratchets. It will thus be apparent that the cam levers 67 and 68, when moved to their operative position, will render their associated pawls 75 and 76 inoperative.

Only one of the cam levers 67 or 68 may be in its operative position at one time, whereas either one or both of them may be held inoperative by means of the actuating mechanism thereof, which comprises a pair of pivoted levers 85 and 86 associated with the cam levers 67 and 68, respectively. The pivoted levers 85 and 86 are pivoted at 87 and 88 on projections 89 and 90 formed on the standard 16. The lower ends of the levers 85 and 86 have arms 85a and 86a extending horizontally therefrom for cooperating with the cam levers 67 and 68 and for weighting the lower ends of the levers 85 and 86 to cause them normally to tend to move into a vertical position, whereby the upper ends of the levers 85 and 86 (Figs. 2, 8 and 9) are held on the camming surfaces of a camming bar 91. The camming bar 91 is slidable on a pair of shouldered pins 92 and 93 extending outwardly from the standard 16. The camming bar 91 has slots 94 and 95 formed therein for receiving the reduced portion of the shouldered pins 92 and 93, respectively, and has cam faces 96, 97 and 98 (Figs. 8 and 9) against which the pivoted levers 85 and 86 rest, the lever 85 engaging either the cam face 96 or the cam face 97, and the lever 86 engaging either the cam face 97 or the cam face 98, depending upon the position of the camming bar 91.

Mounted upon the left end (Fig. 1) of the shaft 22 is an eccentric 105 (Fig. 3), to which the actuating rod 73 is pivotally attached, so that upon rotation of the shaft 22, the actuating rod 73 will oscillate the pawl supporting lever 69 to cause it to rock about its shaft 57. Oscillation of the lever 69 will cause the gear 54 to be driven in either a clockwise or counter-clockwise direction through the pawl and ratchet mechanism, depending upon which of the pawls 75 or 76 is operative, and the pawls are operative under control of the camming bar 91. The camming bar 91 may be shifted manually to the position shown in Figs. 2, 8 and 9 by means of the handle 160 at the initiation of the film feeding operation of the machine to cause film to be fed from the reel 33 to the reel 32, and once the reel feeding operation starts, the reel will continue to be fed intermittently until the desired portion thereof is in alignment with the enlarging station 47.

The sensing mechanism includes a tiltable L-shaped frame 106 (Fig. 4) having a plurality of apertures 107 therein for slidably supporting one end of a series of selector bars 108. There are, in the present embodiment of the invention, ten of the selector bars 108, the reduced right ends of which (Figs. 4 and 5) are slidably mounted in the apertures 107. The L-shaped frame 106 is pivoted on a stud shaft 109, which extends horizontally from the standard 16, and supports the L-shaped frame 106, a pin bar 110 and a series of ten slotted levers 111, in which the selector bars 108 are slidably mounted. Adjacent to the left end (Fig. 4) of each of the selector bars 108, there is formed a vertically extending sensing pin 115. These sensing pins 115 are adapted to engage the surface of the film 34 when it is resting on the perforated plate 40 (Figs. 5 and 6), and if perforations are found in the film 34, the sensing pins will pass through the perforations. The pins will pass through the perforations only when every pin finds a perforation in the film. Each of the selector bars 108 also carries a horizontally extending stud 116 (Fig. 6) which rides in a slot 117 formed in the lever 111 associated therewith. All of the selector bars 108 have slots 118 formed therein for receiving the extending end of the stud shaft 109.

The upper surface of each selector bar 108 has formed thereon a number indicating portion 119, on which is suitably marked the digits 1 to 9, inclusive, and zero, which may be viewed through a slot 120 formed in a plate 121 mounted upon the L-shaped frame 106. Also formed on the upper surface of each of the selector bars 108 are a series of indentations 127 for cooperation with a retaining spring 122, which is mounted upon the L-shaped frame 106 and extends over the selector bars. The pin bar 110, as clearly shown in Figs. 4, 5 and 6, is adapted to receive a series of nine removable pins 123, and has springs 124 fixed thereto, whereby the pins 123 may be secured in the apertures 125 in the pin bar with the lower end (Fig. 6) of the pins extending beyond the bottom of the pin bar. The left end (Fig. 4) of the L-shaped frame 106 has substantially the same construction as the pin bar 110 whereby any of the nine pins 123 may be taken from the pin bar and placed in any of nine holes formed in the frame 106.

It will thus be apparent that when the frame 106 is permitted to tilt into engagement with the film 34, those sensing pins 115 which find holes in the film will be permitted to pass through the film, and in like manner the pins 123, if so arranged as to find holes in the film, will also pass through these holes, and the entire framework, comprising the pin bar 110, frame 106 and selector bars 108, will move down to a position to carry all of the pins into the corresponding apertures in the film. However, if any one of the pins 115 or 123 does not find a hole in the film, that pin will hold the entire assembly and prevent the assembly from rocking in a counter-clockwise direction as far as it would rock if the pins had all found holes in the film.

The selector bars 108 in the present embodiment of the invention are, as pointed out hereinbefore, ten in number, thereby permitting the selection, by the sensing mechanism, of any ten digit number. In addition to this selection, the presence or absence and position of dashes between the numbers may be determined by the pins 123, as will be more fully described in connection with the description of operation of the device.

Mounted upon the shaft 22 (Fig 3) are a pair of cams 130 and 131, having cam rollers 132 and 133 associated therewith. The cam roller 132 is mounted on the end of a bell crank lever 134 and the cam roller 133 is mounted on the end of a bell crank lever 135 (Fig. 2). A rod 140, slidable in a slot 142 in a bracket 143, has one end pinned to the upper arm of the bell crank 134 and the other end thereof extends under a part of the frame 106 (Figs. 3, 4 and 5), a slot 141 being formed in the pin bar 110 and a slot 144 being formed in the frame 106 for receiving the end of the rod 140 and permitting downward movement of the rod without necessarily moving the pin bar 110 or frame 106. From the foregoing, it will be apparent that each time the shaft 22 rotates, the cam roller 132 will be permitted to drop into the low portion of the cam 130 to release the frame 106 and permit it to tilt counter-clockwise about its stud shaft 109.

When the pins 115 and 123 all find holes in the film 34, the frame 106 and all of the levers 111 and the pin bar 110 will move downwardly to permit a bail 145 (Fig. 3), mounted on the end of a bell crank 146, to be rocked up and over the edge of the pin bar, levers and frame by means of a rod 147, connecting the bell crank 146 to the bell crank lever 135 carrying the cam roller 133. Mounted upon the bell crank 146 (Fig. 3) is an abutment 149, which cooperates with the camming bar 91. When the cam roller 133 moves into the low portion of the cam 131, the abutment 149 will move the camming bar 91 to the right (Figs. 1, 2 and 3), thereby to rock the pivoted lever 85 in a clockwise direction to release the cam lever 67 and permit it to move its associated pawl 75 out of the teeth of the ratchet 59. This will render both of the pawls 75 and 76 inoperative and the feeding of the film will stop, whereupon the portion of the film for which the machine was searching will be presented at the enlarging station 47, where the image on the film may be directed to a suitable screen or thrown upon a sensitized film, not shown, to be either viewed or reproduced. After the selected portion of the film has been viewed or reproduced, the film may be rewound upon the reel 33 by moving the camming bar 91 downwardly to the right (Fig. 2), the handle 160 being provided for manually operating the camming bar. When the camming bar 91 is moved manually to its extreme right-hand position (Fig. 2), the pivoted lever 86 will tilt slightly in a clockwise direction to bring the upper end thereof into engagement with the portion 97 of the camming bar. When the shaft 22 makes its next rotation, the arm 86a (Fig. 8), will latch the cam lever 68 in its right-hand position to permit the pawl 76 to drive the ratchet 65, thereby to rereel the film on the reel 33.

A better understanding of the structural features described hereinbefore and the mode of operation of the apparatus will be had from the following brief description of the operation of the device.

The film, as shown in Fig. 3, has alternate perforated and imperforate areas 161 and 162, the perforated area 161 being utilized for identifying the information on the imperforate area 162. No picture has been shown on the imperforate area 162, since there may be represented in this area any photographic reproduction of a record of any type. However, the area 161 has been shown, by way of illustration, as having apertures therein corresponding to the setting of the sensing mechanism, as shown in Fig. 4. The number represented by the perforations in the perforated area 162 of the film is 97—85—53. It will be noted that there is a dash between the second and third digits and fourth and fifth digits, counting from the left, that the number has only six digits, and that the sensing mechanism is capable of sensing four more digits. This number has been selected as illustrative of the wide range of selection which may be made by the device. The sensing pins 115 of the unused four right-hand digits provided for in the sensing mechanism will determine that the number used is only a six-digit number due to the fact that perforations 165 are provided in the left-hand row (Fig. 3) of possible holes in the perforated area of the film. The pins 123 have been shifted from the pin bar 110 to the frame 106 in the second and fourth positions from the right in those members. In this manner, the presence of the dashes between the second and third and fourth and fifth digits of the number 97—85—53 is determined. A film 34 having a set of perforations, as shown in the left-hand perforated area 161, (Fig. 3) and wound upon the reel 33, may be threaded through the machine and over the sprocket wheel 43 and attached to the reel 32 with the machine at rest. The operator may then adjust the selector bars 108 to any desired position; for example, the position shown in Fig. 4, where the spring 122 will hold the bars with the digits 978553 exposed at the slot 128 from left to right (Fig. 1) and with the bars indicating no digit is set up in the right-hand four rows available (Fig. 1) (the lower four bars Fig. 4). Since the number chosen for illustration has dashes between the second and third and fourth and fifth digits, the operator will move the pins 123 from the pin bar 110 to the frame 106 in those positions representing the second and fourth spaces between the digits. If the number chosen had no dashes in it, all pins 123 would remain in the pin bar 110, and if there was a dash between all adjacent digits, all of the pins would be positioned in the frame 106. After the operator has thus set the sensing mechanism, the operator may then move the camming bar 91 to the position shown in Figs. 2, 8 and 9 and the driving mechanism, including the eccentric 105, actuator bar 73, pawl 75 and ratchet 59, will intermittently move the film from the reel 33 to the reel 32. Each time the driving mechanism moves the reel forward, the frame 106 and its cooperating pins 115 and 123 will be dropped onto the film to sense it and determine whether the perforations in the area 161 on the film correspond to the setting of the pins.

From the foregoing, it is believed to be apparent that when the portion of the film shown in Fig. 3 arrives at the sensing station, all the pins 123 and 115 will find apertures in the film if the pins are arranged as shown in Fig. 4, and therefore the frame 106 will tilt in a counter-clockwise direction about the stud shaft 109 to permit the bail 145 to rock in a clockwise direction up over the top of the levers 111, frame 106, and pin bar 110, thereby to shift the camming bar 91 from the position shown in Figs. 2, 8 and 9 just sufficiently to rock the pivoted lever 85 and bring the arm 85a thereof out of engagement with the right-hand edge (Fig. 9) of the cam lever 67. When this happens, the next rotation of the shaft 22 will cause the cam lever 67 to cam the pawl 75 out of engagement with the teeth of the ratchet 59 and the feeding sprocket 43 will remain stationary due to the fact that intermittent rotation is no longer imparted to the gear 54. When this occurs, the selected picture will be presented at the enlarging station 47, and after the picture has been projected or reproduced in any suitable manner, the operator may move the camming bar 91 downwardly to the right (Figs. 2, 8 and 9) to permit the pivoted lever 86 to assume the position shown in dot and dash lines (Fig. 8) where its arm 86a will catch the cam lever 68 and cause the cam lever to be moved out of association with the pawl 76. The pawl 76 will, thereupon, intermittently rotate the ratchet 65 and its associated gear 54 to rereel the film onto reel 33. After the film has thus been rereeled, the operator may move the camming bar 91 to its intermediate position, where the levers 85 and 86 are on the cam faces 96 and 98, respectively, and the feeding mechanism will become inoperative. The operator may then place a new reel 33 on the shaft 31, and after threading it onto the reel 32, may move the camming bar 91 to the position shown in Fig. 2 to initiate another selecting cycle.

Although the specific embodiment of the invention has been described in detail hereinbefore, it will be apparent that many modifications of the structure might be made without departing from the scope of the invention, which is to be limited only by the scope of the appended claims.

What is claimed is:

1. In an apparatus for selecting a record from a group of records on a film comprising film feeding means, means movable into association with said film, a plurality of settable pins carried by said means to engage the surface of said film or to pass through perforations in said film, means operable to engage said pin carrying means when the pins engage the surface of said film and operable to pass over part of the pin carrying means when the pins pass through perforations in said film, and means controlled by the last mentioned means for stopping the film feeding means.

2. In a record selecting apparatus, a drive mechanism for feeding a film having a plurality of records thereon in either of two directions comprising an actuator bar, means for reciprocating said actuator bar, a pair of oppositely disposed pawls driven by said bar, a pair of ratchets associated with said pawls, and means under control of the film for rendering one of said pawls inoperative.

3. In a record selecting apparatus, a drive mechanism for feeding a film having a plurality of records thereon in either of two directions comprising an actuator bar, means for reciprocating said actuator bar, a pair of oppositely disposed pawls driven by said bar, a pair of ratchets associated with said pawls, means under control of the film for rendering one of said pawls inoperative, and means for rendering the other pawl operative.

4. An apparatus for selecting a record from a group of records on a film including means for moving the film intermittently, settable sensing means movable into association with the film after each intermittent movement thereof, and means controlled by the settable sensing means for rendering the moving means ineffective when the settable sensing means finds a record corresponding to the setting of the settable sensing means.

5. An apparatus for selecting a record from a group of records on a strip comprising a plurality of sensing pins, means for setting said pins to represent a number, means for moving said strip past the pins with an intermittent motion, means for moving the pins into association with the strip while it is stationary to sense it, and means operable when all the pins find holes in the strip for stopping the intermittent motion of the film.

6. In a record selecting apparatus, a drive mechanism for feeding a film having a plurality of records thereon in either of two directions, comprising an actuator bar, means for reciprocating said actuator bar, a pair of oppositely disposed pawls driven by said bar, a pair of ratchets associated with said pawls, means under control of the film for rendering one of said pawls inoperative, and means selectively operable for rendering the other pawl operative and for rendering either or both of said pawls inoperative.

7. In an apparatus for selecting a record from a group of records on a film, film advancing means including a rotatable shaft, a driving gear fixed to said shaft for moving the film in either of two directions, a drive lever freely oscillatable about said shaft, a pair of oppositely disposed ratchet wheels fixed to said shaft, a pair of pawls carried by said lever for selectively driving said ratchet wheels, a pair of latching levers mounted on said shaft for normally holding the pawls out of engagement with the ratchets, a pair of trip levers operable to render the latch levers inoperative, and means for oscillating the drive lever.

8. In a record selecting apparatus, an eccentric drive, a lever oscillated by said drive, a pair of pawls carried by said lever, a pair of ratchets associated with said pawls and adapted to be driven by said pawls, and means for locking either or both of said pawls out of engagement with their associated ratchets.

9. In a record selecting apparatus, an eccentric drive, a lever oscillated by said drive, a pair of pawls carried by said lever, a pair of ratchets associated with said pawls and adapted to be driven by said pawls, means for locking either or both of said pawls out of engagement with their associated ratchets, and a camming bar positionable to render either or both of said locking means operative.

10. In an apparatus for selecting a record from a group of records on a film, means tending to draw the film in opposite directions, a driving sprocket for positively advancing the film in either of said directions, means for controlling the operation of the sprocket including a pair of driving pawls, a pair of ratchets associated with said driving pawls, means for manually rendering one of said pawls operative to cause the film to be moved in one direction, and means under control of the film for rendering said pawl inoperative.

CECIL C. McCAIN.